US007652824B2

(12) United States Patent
Ayala et al.

(10) Patent No.: US 7,652,824 B2
(45) Date of Patent: Jan. 26, 2010

(54) SYSTEM AND/OR METHOD FOR COMBINING IMAGES

(75) Inventors: Alfredo Ayala, West Covina, CA (US); David Desmarais, South Pasadena, CA (US); Holger Irmler, Studio City, CA (US); Michael Ilardi, North Hollywood, CA (US)

(73) Assignee: Disney Enterprises, Inc., Burbank, CA (US)

( * ) Notice: Subject to any disclaimer, the term of this patent is extended or adjusted under 35 U.S.C. 154(b) by 34 days.

(21) Appl. No.: 11/946,688

(22) Filed: Nov. 28, 2007

(65) Prior Publication Data

US 2009/0136157 A1 May 28, 2009

(51) Int. Cl.
*G02B 27/14* (2006.01)

(52) U.S. Cl. ........................ 359/629; 359/631; 359/633

(58) Field of Classification Search ......... 359/629–636, 359/618, 364, 365, 366, 471
See application file for complete search history.

(56) References Cited

U.S. PATENT DOCUMENTS 5,844,713 A * 12/1998 Nanba et al. ................ 359/364
6,118,484 A * 9/2000 Yokota et al. ............... 348/350

OTHER PUBLICATIONS

"The Haunted Mansion", retrieved from answers.com, Wikipedia: Haunted Mansion, Jun. 16, 2009, 25 pages.
"The Haunted Mansion", Jun. 16, 2009, 25 pages.

* cited by examiner

*Primary Examiner*—Mohammed Hasan
(74) *Attorney, Agent, or Firm*—Berkeley Law & Technology Group, LLP

(57) ABSTRACT

The subject matter disclosed herein relates to a method and/or system for generating a dynamic image based, at least in part, on attributes associated with one or more individuals.

23 Claims, 5 Drawing Sheets

SYSTEM AND/OR METHOD FOR COMBINING IMAGES

BACKGROUND

1. Field

The subject matter disclosed herein relates to combining images to be viewed by an observer.

2. Information

Visual illusions are typically employed in theaters, magic shows and theme parks to provide patrons and/or an audience the appearance of the presence of an object, when such an object is in fact not present. Such illusions are typically generated using, for example, mirrors and other optical devices. However, such illusions typically created in a predetermined manner and are not tailored to audience members and/or patrons.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of claimed subject matter. Thus, the appearances of the phase "in one embodiment" or "an embodiment" in various places throughout this specification are not necessarily all referring to the same embodiment. Furthermore, the particular features, structures, or characteristics may be combined in one or more embodiments.

Briefly, one embodiment relates to an apparatus comprising a display device operable to generate a dynamic image and a half mirror positioned to present a combined image to an observer. Such a combined image may comprise a reflected component and a transmitted component. The reflected component may comprise a reflection of an image of one or more objects at a location separated from one surface of the half mirror. The transmitted component may comprise a transmission of the dynamic image through the half mirror to appear to the observer in the combined image as being in proximity to the location of the one or more objects in the reflected component.

Figure 1:
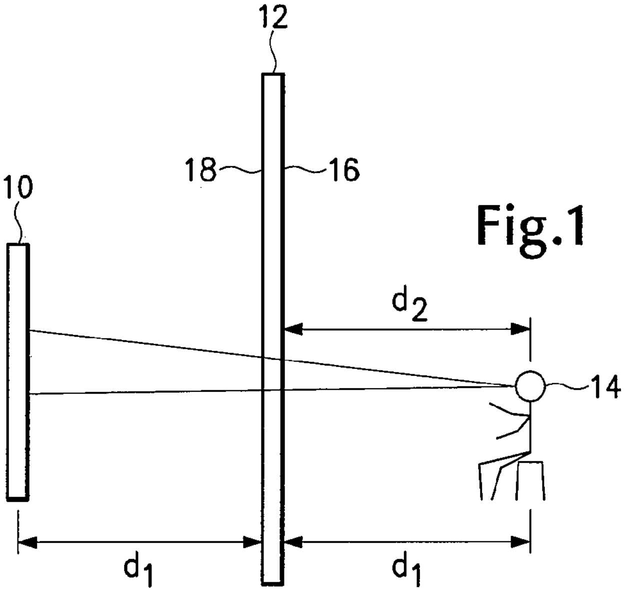
FIG. 1 is a schematic diagram of an apparatus to provide a combined image to an observer according to an embodiment.

FIG. 1 is a schematic diagram of an apparatus to project a combined image to an observer 14 according to an embodiment. Light impinging on surface 16 of half mirror 12 may be reflected to observer 14. Accordingly, images of objects at or near observer 14 may be visibly reflected back to observer 14. In contrast, light impinging on surface 18 may be transmitted through half mirror 12 to observer 14. Accordingly, objects and/or images on a side of half mirror 12 which is opposite observer 14 may be visibly transmitted through half mirror 12 to be viewable by observer 14 in the combined image. Half mirror 12 may comprise any one of several commercially available half mirror products such as, for example, half mirror products sold by Professional Plastics, Inc. or Alva's Dance and Theater Products. More generally, any device or structure that provides a substantially flat surface that is partially reflective and partially transmissive may be employed as half mirror 12 in accordance with claimed subject matter.

According to an embodiment, half mirror 12 may provide a combined image comprising a reflected component reflected from surface 16 and a transmitted component received at surface 18 and transmitted through half mirror 12. Accordingly, objects appearing in images of the transmitted component transmitted through half mirror 12 may appear to observer 14 as being combined and/or co-located with objects appearing in images of the reflected component. To observer 14, images in the transmitted in the transmitted component may appear to observer 14 as images being reflected off of surface 16 (along with images in the reflected component). In a particular embodiment, objects in images transmitted in the transmitted component may appear to be located at or near objects in images in the reflected component.

According to an embodiment, a display device 10 may generate dynamic images that vary over time. Such dynamic images may comprise, for example, images of animation characters, humans, animals, scenery or landscape, just to name of few examples. Dynamic images generated by display device 10 may be transmitted through half mirror 12 to be viewed by observer 14. While looking in the direction of half mirror 12, observer 14 may view a combined image comprising a transmitted component received at surface 18 of half mirror 12 (having the dynamic image generate by display device 10) and reflected component reflected from surface 16 (having images of objects at or around the location of observer 14). As perceived from observer 14 while looking in the direction of half mirror 12, accordingly, objects in images of the transmitted component may appear to be co-located with objects in dynamic images in the reflected component.

As objects in images of the transmitted component may appear to observer 14 as being co-located with objects in images of the reflected component, changing a position of display 10 relative to half mirror 12 may affect how positioning of objects in images of the transmitted component may appear to observer 14. As shown in FIG. 1, display device 10 is separated from half mirror 12 by a distance $d_1$ to have dynamic images generated from display device 10 appear to observer 14 (again, while looking in the direction of half mirror 12) as being co-located with objects at about distance $d_1$ from half mirror 12 on a side opposite of display device 10.

Figure 2:
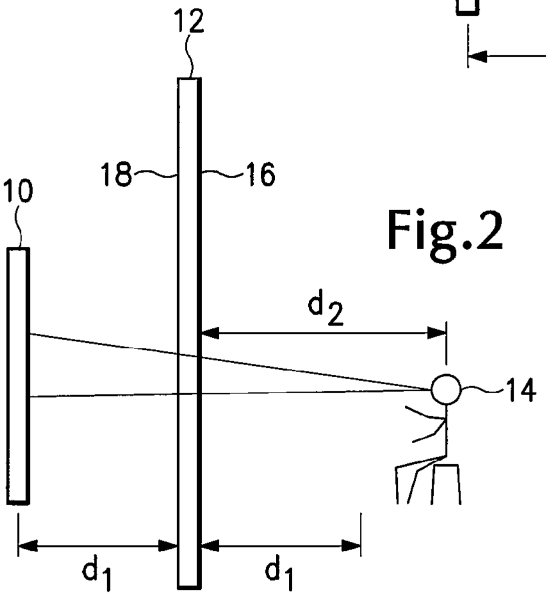
FIG. 2 is a schematic diagram of an apparatus to provide a combined image having a transmitted component appearing to an observer as an object positioned in front of the observer in a reflected image.
Figure 3:
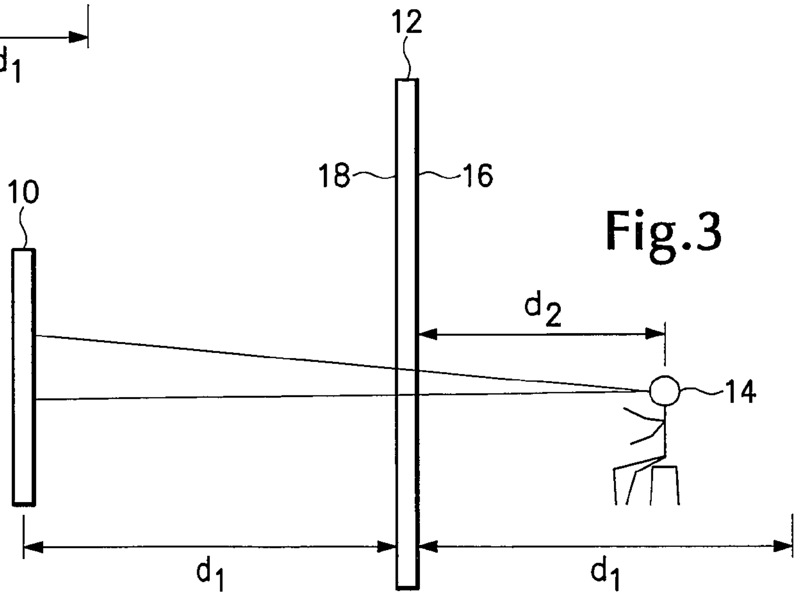
FIG. 3 is a schematic diagram of an apparatus to provide a combined image having a transmitted component appearing to an observer as an object positioned behind the observer in a reflected image.

Here, distance $d_1$ is about the same as distance $d_2$, the distance of observer 14 from half mirror 12, making dynamic images generated by display device 10 appear to observer as being co-located with observer 14. Alternatively, as illustrated in FIG. 2, display device 10 may be positioned at a distance from half mirror 12 less than $d_2$, having dynamic images generated from display device 10 to appear to observer 14 (while looking in the direction of half mirror 12) in the combined image as being in front of observer 14 and/or between observer 14 and half mirror 12. In yet another alternative, as shown in FIG. 3, display device 10 may be positioned at a distance from half mirror 12 greater than $d_2$, having dynamic images generated from display device 10 to appear to observer 14 (while looking in the direction of half mirror 12) in the combined image as being behind observer 14.

In one embodiment, distance $d_1$ may be varied by changing a position of half mirror 12 relative to display device 10. For example, distance $d_1$ may be varied by physically moving display device 10 toward or away from half mirror 12 while half mirror 12 remains stationary. Accordingly, an appearance of objects in a dynamic image generated by display device 10 in a combined to observer 14 (while looking in the direction of half mirror 12) may be changed to be either in front of observer 14, co-located with observer 14 or behind observer 14 by moving display device 10 toward or away from half mirror 12.

According to an embodiment, display device 10 may generate dynamic images based, at least in part, on image data such as, for example, digitized luminance and/or chrominance information associated with pixel locations in display device 10 according to any one of several known display formats, connector formats and resolutions. Device 10 may employ any available display standard(s) and/or format(s), including such standards and/or formats that are responsive to analog or digital image signal.

Display device 10 may employ any one of several technologies for generating a dynamic image such as, for example, a liquid crystal display (LCD), cathode ray tube, plasma display, digital light processor (DLP), field emission device and/or the like. Alternatively, display device 10 may comprise a reflective screen in combination with projector (not shown) for presenting dynamic images.

According to an embodiment, display device 10 may generate dynamic images based, at least in part, on computer generated image data. In one particular embodiment, such computer generated image data may be adapted to generate three-dimensional dynamic images from display device 10. Accordingly, objects in such a three-dimensional image may appear in a combined image as three dimensional objects by observer 14 while looking toward half mirror 12. Also, image data for providing dynamic images through display device 10 may be generated based on and/or in response to real-time information such as, for example, attributes of observer 14 and/or other individuals.

In one embodiment, observer 14 may be a guest at a theme park ride, an audience member, just to name a few examples of environments in which an observer may be able to view a combined image by looking in the direction of a half mirror. In other embodiments, observer 14 may comprise an individual playing a video game or otherwise interacting with a home entertainment system. As such, a dynamic image generated by display device 10 may be based, at least in part, on any one of several attributes of observer 14 and/or other individuals. Such attributes may comprise, for example, one or more of an apparent age, height, gender, voice, identity, facial features, eye location, gestures, presence of additional individuals co-located with the individual, posture and position of head, just to name a few examples.

In one example, a dynamic image generated by display device 10 may comprise animated characters appearing in a combined image to interact with observer 14 or other individuals. In particular embodiments, such characters may be generated to appear as interacting with individuals by, for example, making eye contact with an individual, touching an individual, putting a hat on an individual and then taking the hat off, talking to the individual, just to name a few example. Again, such characters may be generated based, at least in part, on real-time information such as attributes of one or more individuals as identified above. In one embodiment, the type of character generated may be based, at least in part, on an apparent height, age and/or gender of one or more individuals co-located with observer 14, for example.

In another example, a dynamic image generated by display device 10 may comprise characters appearing to observer 14 to be in front of or behind observer 14 (and/or in front of or behind other individuals co-located with observer 14). As illustrated above, objects in a transmitted component of a combined image may appear to observer 14 has being co-located with observer 14, in front of observer 14 or behind observer 14 by varying distance $d_1$. By varying distance $d_1$, characters may appear to observer 14 in a transmitted component of a combined image to be staring at observer 14 from in front of and/or beneath observer 14, or staring at observer 14 from behind and/or above observer 14.

In another example, a dynamic image may be generated by display device 10 based, at least in part, on locations and/or numbers of individuals co-located with observer 14 such as individuals riding with observer 14 in a passenger compartment of a theme park ride. In one embodiment, display device 10 may generate dynamic images of characters as appearing in a combined image to sit among and/or in between individuals. Here, for example, such characters may be generated to appear in the combined image to be interacting with multiple individuals by, for example, facing individuals in a conversation, speaking to such individuals or otherwise providing an appearance of joining such a conversation.

Figure 4A:
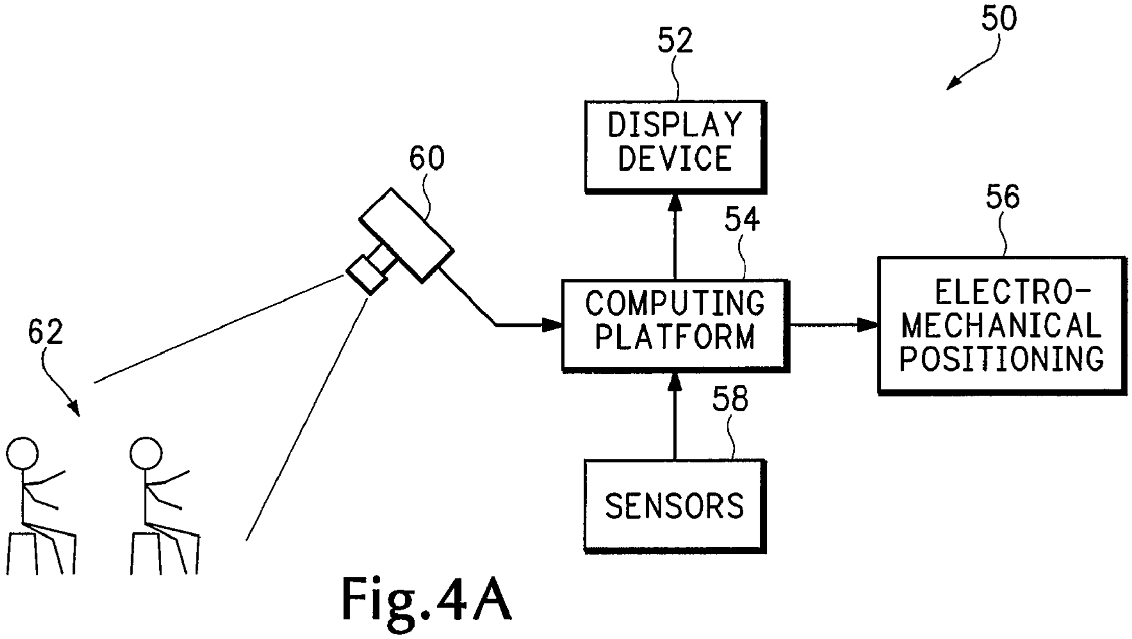
FIG. 4A is a schematic diagram of an apparatus to alter a transmitted image to be combined with a reflected image based, at least in part, on attributes of one or more individuals.

FIG. 4A is a block diagram of an apparatus 50 to affect a transmitted component of a combined image to be combined with a reflected component of the combined image based, at least in part, on attributes of one or more individuals. Again, an observer looking toward a half mirror (not shown) may view such a combined image where a reflected component is received from a reflective surface of the half mirror and a transmitted component comprises a dynamic image generated by display device 52 and transmitted through the half mirror. Here, computing platform 54 may generate digital image data based, at least in part, on attributes associated with one more individuals 62 as discussed above. Display device 52 may then generate a dynamic image based on such digital image data.

In addition, computing platform 54 may transmit one or more control signals to electro-mechanical positioning subsystem 56 to alter a distance between display device 52 and a half mirror to, for example, affect an apparent location of one or more objects in a dynamic image generated by display device 52 as illustrated above. Here, for example, computing platform 54 may alter such a distance between display device 52 so that an object in a transmitted component of a combined image appears to an observer looking toward the half mirror as being co-located with, behind or in front of an individual as discussed above, for example.

According to particular embodiments, computing platform 54 may deduce attributes of individuals 62 (e.g., for determining digital data to generate a dynamic image in display device 52) based, at least in part, on information obtained from one or more sources. In one embodiment, computing platform 54 may deduce attributes of individuals 62 based, at least in part, on images of individuals 62 received from one or more cameras 60. Such attributes of individuals 62 obtained from images may comprise facial features, eye location, gestures, presence of additional individuals co-located with the individual, posture and position of head, just to name a few examples. In a particular embodiment, computing platform 54 may host image processing and/or pattern recognition software to, among other things, deduce attributes of individuals based, at least in part, on image data received at cameras 60.

In addition to using images to deduce attributes of individuals, computing platform 54 may also deduce attributes of individuals based, at least in part, on information received from sensors 58. Sensors 58 may comprise, for example, one or more microphones (e.g., to receive voices and/voice commands from individuals 62), pressure sensors (e.g., in seats of passenger compartments of a theme park ride to detect a number of individuals in the passenger compartment), radio frequency ID (RFID) sensors, just to name few of examples. Other sensors may comprise, for example, accelerometers, gyroscopes, cell phones, Bluetooth enabled devices, WiFi enabled devices and/or the like. Accordingly, computing platform 54 may host software to, among other things, deduce attributes of individuals based, at least in part, on information received from sensors 58. For example, such software may comprise voice recognition software to deduce attributes of an individual based, at least in part, on information received at a microphone and one or more voice signatures.

In one embodiment, an individual 62 may wear and/or be co-located with an RFID device capable of transmitting a signal encoded with a unique code and/or marking associated with the individual 62. Also, computing platform 54 may maintain and/or have access to a database (not shown) that associates attributes of individuals with such unique codes or markings. Upon receipt of such a unique code and/or marking (e.g., from detecting an RFID device in proximity to an RFID sensor), computing platform 54 may access the database to determine one or more attributes of an individual associated with the unique code and/or marking.

Figure 4B:
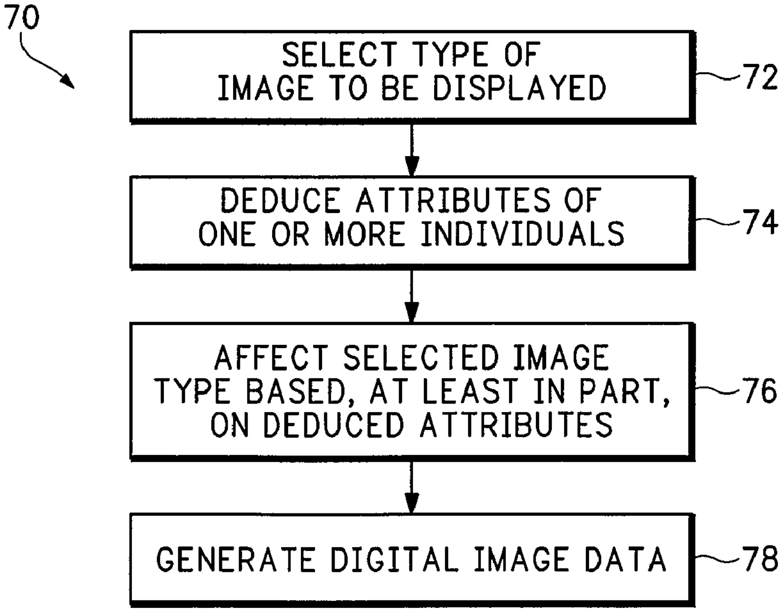
FIG. 4B is a flow diagram illustrating a process to generate digital image data according to an embodiment.

According to an embodiment, computing platform 54 may provide digital image data to display device 52 as according to a process 70 illustrated in FIG. 4B. Here, block 72 may select a type of image to be displayed (e.g., for transmission through a half mirror as illustrated above) based on one or more factors such as, for example, a theme, progression in a story line, time of day, position in a predetermined sequence, and/or the like. Alternatively, such images may be selected in real-time in response to events detected by wireless pointers, tags, Bluetooth receivers, and/or the like. Block 74 may deduce one or more attributes of individuals using, for example, software adapted to process information from one or more sources as illustrated above. Block 76 may affect an appearance of an image selected at block 72 based, at least in part, on attributes of one or more individuals deduced at block 74. Block 76 may employ a set of rules and/or an expert system to determine how an image is to be affected based, at least in part, on attributes of individuals. Block 78 may provide digital image data to a display device according to some predetermined format.

According to an embodiment, computing platform 54 may employ any one of several techniques for determining dynamic images to be generated by display device 52 based, at least in part, on attributes of one or more individuals 62. For example, computing platform 54 may employ pattern recognition techniques, rules and/or an expert system to deduce attributes of individuals based, at least in part, on information received from camera 60 and/or sensors 58. In one particular embodiment, for the purpose of illustration, such rules and/or expert system may determine a number of individuals present by counting a number of human eyes detected and dividing by two. In another particular embodiment, again for the purpose of illustration, such rules and/or expert system may categorize an individual as being either a child or adult based, at least in part, on a detected height of the individual. Also, computing platform 54 may determine specific dynamic images to be generated by display device 52 based, at least in part, on an application of attributes of individuals 62 (e.g., determined from information received at camera 60 and/or sensors 58) to one or more rules and/or an expert system.

Figure 5:
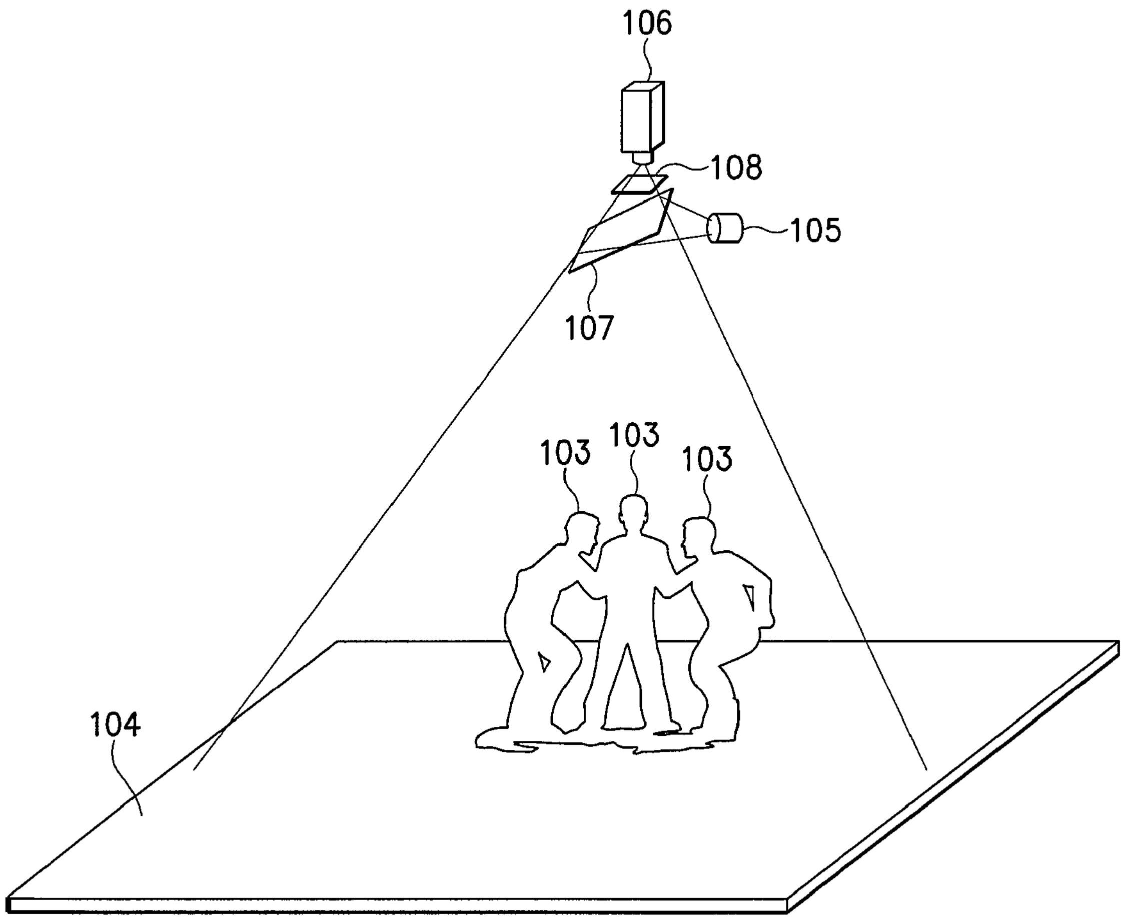
FIG. 5 is a schematic diagram of a system for obtaining image data for use in deducing attributes of individuals according to an embodiment.

According to an embodiment, computing platform 54 may deduce attributes from one or more individuals based, at least in part, on information obtained from a video camera such as video camera 106 shown in FIG. 5. In particular implementations, video camera 106 may comprise an infrared (IR) video camera that is sensitive to IR wavelength energy in its field of view. Here, individuals 103 may generate and/or reflect energy detectable at video camera 106. In one embodiment, individuals 103 may be lit by one or more IR illuminators 105 and/or other electromagnetic energy source capable of generating electromagnetic energy with a relatively limited wavelength range.

IR illuminators 105 may employ multiple infrared LEDs to provide a brighter, more uniform field of infrared illumination over area 104 such as, for example, the IRL585A from Rainbow CCTV. More generally, any device, system or apparatus that illuminates area 104 with sufficient intensity at suitable wavelengths for a particular application is suitable for implementing IR illuminators 105. Video camera 106 may comprise a commercially available black and white CCD video surveillance camera with any internal infrared blocking filter removed or other video camera capable of detection of electromagnetic energy in the infrared wavelengths. IR pass filter 108 may be inserted into the optical path of camera 106 optical path to sensitize camera 106 to wavelengths emitted by IR illuminator 105, and reduce sensitivity to other wavelengths. It should be understood that, although other means of detection are possible without deviating from claimed subject matter, human eyes are insensitive to infrared illumination and such infrared illumination can be used without being detected by human eyes and without interfering with visible light in interactive area 104 or alter a mood in a low-light environment.

Figure 6:
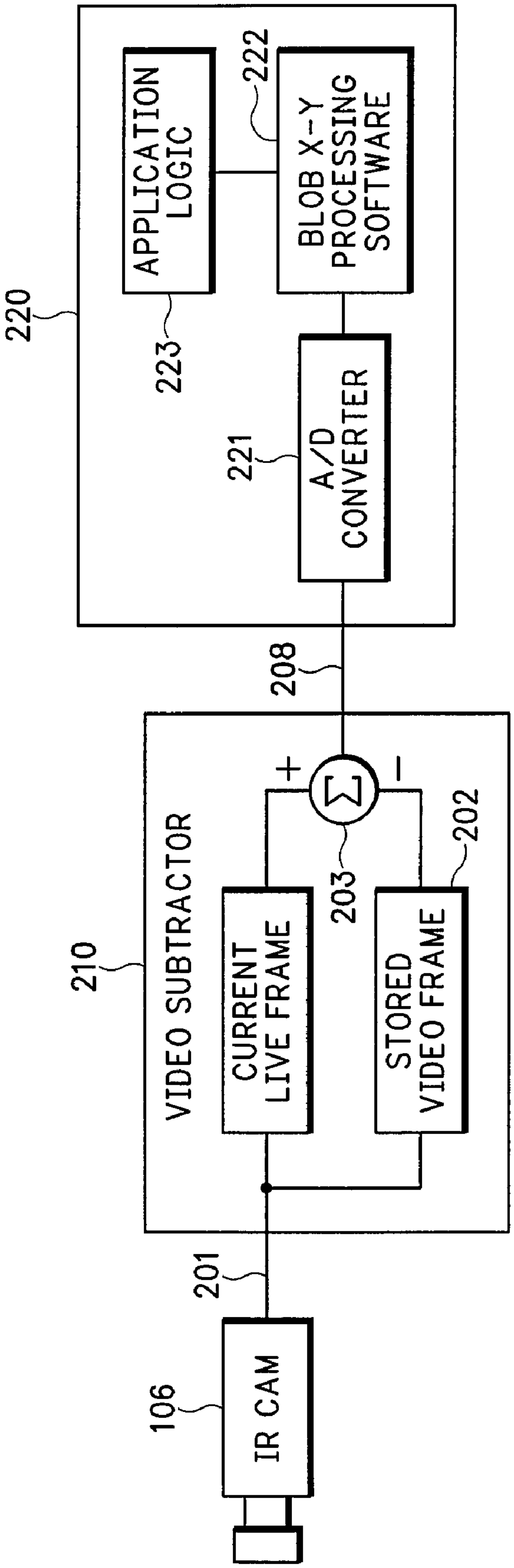
FIG. 6 is a schematic diagram of a system for processing image data for use in deducing attributes of individuals according to an embodiment.

According to an embodiment, information collected from images of individuals 103 captured at video camera 106 may be processed in a system as illustrated according to FIG. 6. Here, such information may be processed to deduce one or more attributes of individuals 103 as illustrated above. In this particular embodiment, computing platform 220 is adapted to detect X-Y positions of shapes or "blobs" that may be used, for example in determining locations of individuals 103, facial features, eye location, gestures, presence of additional individuals co-located with individuals, posture and position of head, just to name a few examples. Also, it should be understood that specific image processing techniques described herein are merely examples of how information may be extracted from raw image data in determining attributes of individuals, and that other and/or additional image processing techniques may be employed without deviating from claimed subject matter.

According to an embodiment, information from camera 106 may be pre-processed by circuit 210 to compare incoming video signal 201 from camera 106, a frame at a time, against a stored video frame 202 captured by camera 106. Stored video frame 202 may be captured when are 104 is devoid of individuals or other objects, for example. However, it should be apparent to those skilled in the art that stored video frame 202 may be periodically refreshed to account for changes in area 104.

Video subtractor 203 may generate difference video signal 208 by, for example, subtracting stored video frame 202 from the current frame. In one embodiment, this difference video signal may display only individuals and other objects that have entered or moved within area 104 from the time stored video frame 202 was captured. In one embodiment, difference video signal 208 may be applied to a PC-mounted video digitizer 221 which may comprise a commercially available digitizing unit, such as, for example, the PC-Vision video frame grabber from Coreco Imaging.

Although video subtractor 210 may simplify removal of artifacts within a field of view of camera 106, a video subtractor is not necessary in all implementations of claimed subject matter. By way of example, without intending to limit claimed subject matter, locations of targets may be monitored over time, and the system may ignore targets which do not move after a given period of time until they are in motion again.

According to an embodiment, blob detection software 222 may operate on digitized image data received from A/D converter 221 to, for example, calculate X and Y positions of centers of bright objects, or "blob", in the image. Blob detection software 222 may also calculate the size of such detected blob. Blob detection software 222 may be implemented using user-selectable parameters, including, but not limited to, low and high pixel brightness thresholds, low and high blob size thresholds, and search granularity. Once size and position of any blobs in a given video frame are determined, this information may be passed to applications software 223 to determine deduce attributes of one or more individuals 103 in area 104.

Figure 7:
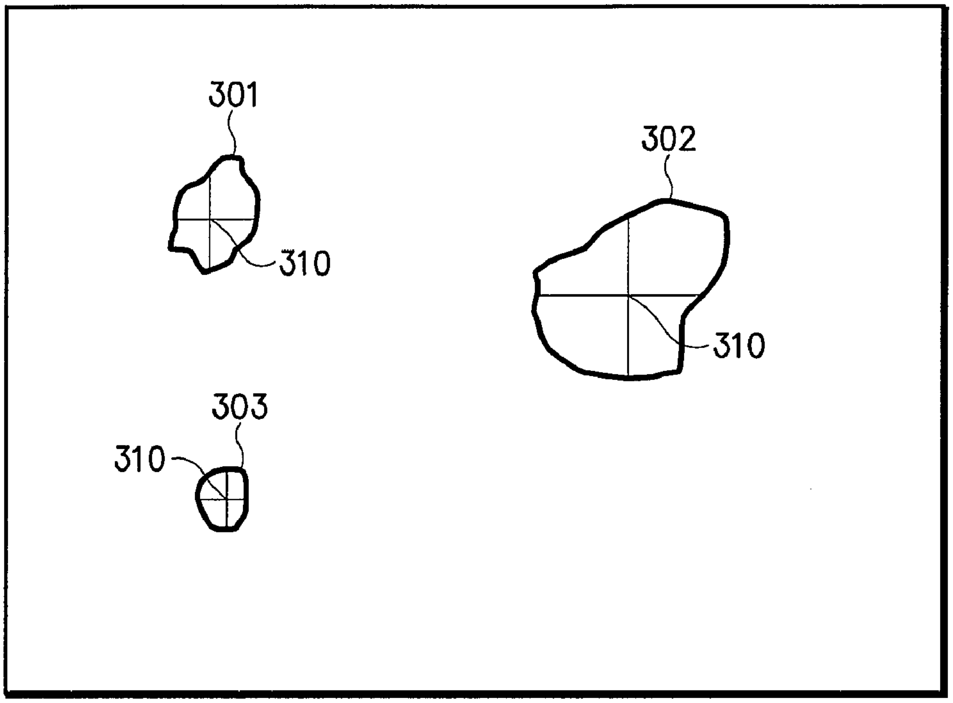
FIG. 7 is a diagram illustrating a process of detecting locations of blobs based, at least in part, on video data according to an embodiment.

FIG. 7 depicts a pre-processed video image 208 as it is presented to blob detection software 222 according to a particular embodiment. As described above, blob detection software 222 may detect individual bright spots 301, 302, 303 in difference signal 208, and the X-Y position of the centers 310 of these "blobs" is determined. In an alternative embodiment, the blobs may be identified directly from the feed from video camera 106. Blob detection may be accomplished for groups of contiguous bright pixels in an individual frame of incoming video, although it should be apparent to one skilled in the art that the frame rate may be varied, or that some frames may be dropped, without departing from claimed subject matter.

As described above, blobs may be detected using adjustable pixel brightness thresholds. Here, a frame may be scanned beginning with an originating pixel. A pixel may be first evaluated to identify those pixels of interest, e.g. those that fall within the lower and upper brightness thresholds. If a pixel under examination has a brightness level below the lower brightness threshold or above the upper brightness threshold, that pixel's brightness value may be set to zero (e.g., black). Although both upper and lower brightness values may be used for threshold purposes, it should be apparent to one skilled in the art that a single threshold value may also be used for comparison purposes, with the brightness value of all pixels whose brightness values are below the threshold value being reset to zero.

Once pixels of interest have been identified, and the remaining pixels zeroed out, the blob detection software begins scanning the frame for blobs. A scanning process may begin with an originating pixel. If that pixel's brightness value is zero, a subsequent pixel in the same row may be examined. A distance between the current and subsequent pixel is determined by a user-adjustable granularity setting. Lower granularity allows for detection of smaller blobs, while higher granularity permits faster processing. When the end of a given row is reached, examination proceeds with a subsequent row, with the distance between the rows also configured by the user-adjustable granularity setting.

If a pixel being examined has a non-zero brightness value, blob processing software 222 may begin moving up the frame-one row at a time in that same column until the top edge of the blob is found (e.g., until a zero brightness value pixel is encountered). The coordinates of the top edge may be saved for future reference. Blob processing software 222 may then return to the pixel under examination and moves down the row until the bottom edge of the blob is found, and the coordinates of the bottom edge are also saved for reference. A length of the line between the top and bottom blob edges is calculated, and the mid-point of that line is determined. A mid-point of the line connecting the detected top and bottom blob edges then becomes the pixel under examination, and blob processing software 222 may locate left and right edges through a process similar to that used to determine the top and bottom edge. The mid-point of the line connecting the left and right blob edges may then be determined, and this mid-point may become the pixel under examination. Top and bottom blob edges may then be calculated again based on a location of the new pixel under examination. Once approximate blob boundaries have been determined, this information may be stored for later use. Pixels within the bounding box described by top, bottom, left, and right edges may then be assigned a brightness value of zero, and blob processing software 222 begins again, with the original pixel under examination as the origin.

Although this detection software works well for quickly identifying contiguous bright regions of uniform shape within the frame, the detection process may result in detection of several blobs where only one blob actually exists. To remedy this, blob coordinates may be compared, and any blobs intersecting or touch may be combined together into a single blob whose dimensions are the bounding box surrounding the individual blobs. The center of a combined blob may also be computed based, at least in part, on the intersection of lines extending from each corner to the diagonally opposite corner. Through this process, a detected blob list, which may include, but not be limited to including, the center of blob; coordinates representing the blob's edges; a radius, calculated as a mean of the distances from the center of each of the edges for example; and the weight of a blob, calculated as a percentage of pixels within the bounding rectangle which have a non-zero value for example, can be readily determined.

Thresholds may also be set for the smallest and largest group of contiguous pixels to be identified as blobs by blob processing software 222. By way of example, without intending to limit claimed subject matter, where a uniform target size is used and the size of the interaction area and the height of the camera above area 104 are known, a range of valid target sizes can be determined, and any blobs falling outside the valid target size range can be ignored by blob processing software 222. This allows blob processing software 222 to ignore extraneous noise within the interaction area and, if targets are used, to differentiate between actual targets in the interaction area and other reflections, such as, but not limited to, those from any extraneous, unavoidable, interfering light or from reflective clothing worn by an individual 103, as has become common on some athletic shoes. Blobs detected by blob processing software 222 falling outside threshold boundaries set by the user may be dropped from the detected blob list.

Although one embodiment of computer 220 of FIG. 6 may include both blob processing software 222 and application logic 223, blob processing software 222 and application logic 223 may be constructed from a modular code base allowing blob processing software 222 to operate on one computing platform, with the results therefrom relayed to application logic 223 running on one or more other computing platforms.

Figure 8:
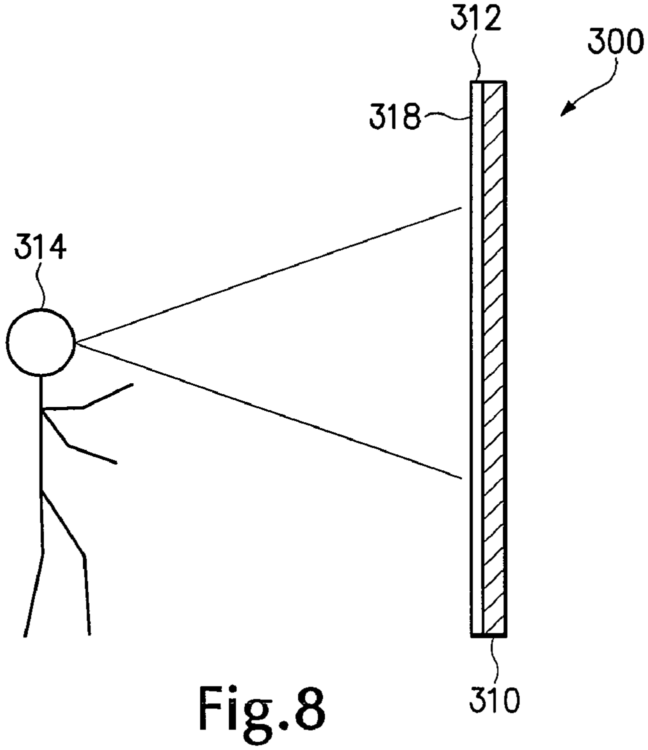
FIG. 8 is a schematic diagram of an apparatus to provide a combined image to an observer according to an alternative embodiment.

FIG. 8 is a schematic diagram of an apparatus 300 to provide a combined image to an observer 314 according to an alternative embodiment. A display device 310 is placed abutting a half-mirror 312 to project a dynamic image to observer 314 through half-mirror while observer 314 is also viewing an image from light reflected from surface 318 of half-mirror 312. Here, a dynamic image may be generated using one or more of the techniques illustrated above such as, for example, generating a dynamic image based, at least in part, on computer generated image data. In one embodiment, apparatus 300 may be mounted to a flat surface such as a wall in a hotel lobby, hotel room or an amusement park, just to name a few examples.

In one particular embodiment, display device 310 may generate a dynamic image as a three dimensional object such as an animated character or person. In addition, such a dynamic image may be generated in combination with an audio component such as music or a voice message. Here, for example, speakers (not shown) may be placed at or around apparatus 300 to generate a pre-recorded audio presentation. In one embodiment, the pre-recorded audio presentation may provide a greeting, message, joke and/or provide an interactive conversation. Such an audio presentation may be synchronized to movement of lips of an animated character or person in the dynamic image, for example.

In one embodiment, apparatus 300 may generate a pre-recorded presentation in response to information received at a sensor detecting a presence of observer 314. Such a sensor may comprise, for example, one or more sensors described above. Upon detecting such a presence of observer 314, display device 310 may commence generating a dynamic image using one or more of the techniques illustrated above. Also, such a detection of a presence of observer 314 may simultaneously initiate generation of an audio message. Also, as illustrated above, apparatus 300 may be adapted to affect a dynamic image being displayed in display device 310. In one particular embodiment, although claimed subject matter is not limited in this respect, sensors (e.g., microphones and mechanical actuators, not shown) may enable observer 314 to interact with dynamic images generated by display device 310. For example, an expert system (not shown) may employ voice recognition technology to receive stimuli from observer 314 (e.g., questions, answers to questions). Apparatus 300 may then generate a dynamic image through display device 310 and/or provide an audio presentation based, at least in part, on such stimuli.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:

a display device to display a dynamic image; and a computing platform adapted to affect one or more changes in said dynamic image in response to one or more attributes associated with one or more individuals;

wherein said computing platform is operatively enabled to:

select one or more images to be displayed based, at least in part, on a theme;

and modify said selected one or more images based, at least in part, on said one or more attributes associated with one or more individuals to provide digital image data representative of said dynamic image; and a half mirror positioned to project a combined image to an observer, said combined image comprising:

a reflected component comprising a reflection of an image of one or more objects at a location; and a transmitted component comprising a transmission of said dynamic image through said half mirror to appear in said combined image as being in proximity to said location.

2. The apparatus of claim 1, wherein said half mirror is positioned to maintain a distance to said display device to affect an apparent position of objects in said transmitted component relative to said location of said one on or more objects in said reflected image.

3. The apparatus of claim 1, wherein said one or more individuals comprises said observer.

4. The apparatus of claim 1, and further comprising one or more cameras, and wherein said one or more attributes are based, at least in part, on images of said one or more individuals obtained at said one or more cameras.

5. The apparatus of claim 1, wherein said computing platform is further adapted to affect said one or more changes in said dynamic image based, at least in part, upon an application of said one or more attributes to one or more predetermined rules.

6. The apparatus of claim 1, wherein said image display device comprises a liquid crystal display device.

7. The apparatus of claim 1, wherein said dynamic image comprises a three-dimensional image.

8. A method comprising:

projecting a dynamic image from a display device;

affecting one or more changes in said dynamic image in response to one or more attributes associated with one or more individuals by selecting one or more images to be displayed based, at least in part, on a theme and modifying said selected one or more images based, at least in part, on said one or more attributes associated with one or more individuals to provide digital image data representative of said dynamic image; and positioning a half mirror to project a combined image to an observer, said combined image comprising:

a reflected component comprising a reflection of an image of one or more objects at a location; and a transmitted component comprising a transmission of said dynamic image through said half mirror to appear in said combined image as being in proximity to said location.

9. The method of claim 8, wherein said positioning said half mirror further comprises positioning said half mirror a distance from said display device to affect an appearance of said dynamic image among said one or more objects.

10. The method of claim 9, and further comprising determining said distance based, at least in part, on a predetermined distance between said half mirror and said location.

11. The method of claim 8, wherein said one or more individuals comprises said observer.

12. The method of claim 8, and further comprising deducing said one or more attributes are based, at least in part, on images of said one or more individuals obtained at said one or more cameras.

13. The method of claim 8, and further comprising affecting said one or more changes in said dynamic image based, at least in part, upon an application of said one or more attributes to one or more predetermined rules.

14. The method of claim 8, wherein said image display device comprises a liquid crystal display device.

15. The method of claim 8, wherein said dynamic image comprises a three-dimensional image.

16. An apparatus comprising:

a computing platform operatively enabled to:

select one or more images to be displayed based, at least in part, on a theme;

modify said selected one or more images based, at least in part, on one or more attributes associated with one or more individuals, and provide digital image data representative of a dynamic image to a display device; said display device being positioned proximate to a half mirror and adapted to transmit said dynamic image through said half mirror to be observable by an individual.

17. The apparatus of claim 16, wherein said computing platform is further operatively enabled to generate said dynamic image in response to detection of a presence of said individual.

18. The apparatus of claim 16, wherein said computing platform is further operatively enabled to generate an audio presentation that is synchronized with said dynamic image.

19. The apparatus of claim 18, wherein said dynamic image comprises an animated person or character, and wherein said audio presentation is synchronized with movement of lips of said person or character.

20. The apparatus of claim 16, wherein said half mirror comprises a half mirror having first and second opposing sides, said half mirror being adapted to reflect images received at said first side away from said half mirror; said half mirror being adapted to transmit one or more images received at said second side through said half mirror.

21. The apparatus of claim 16, wherein said computing platform is communicatively coupled to one or more sensors; wherein said one or more sensors are capable of providing information relating to said one or more attributes associated with one or more individuals.

22. The apparatus of claim 16, further comprising one or more electro-mechanical devices; said one or more electro-mechanical devices adapted to position said half mirror.

23. The apparatus of claim 22, wherein said one or more electro-mechanical devices adjusts a position of said half mirror in response to instructions from said computing platform.

* * * * *